W. F. MARRESFORD.
BELT FASTENER.
APPLICATION FILED DEC. 13, 1912.
1,078,053.
Patented Nov. 11, 1913.
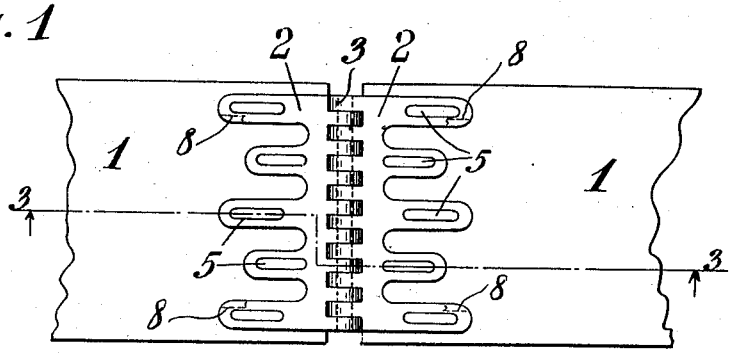
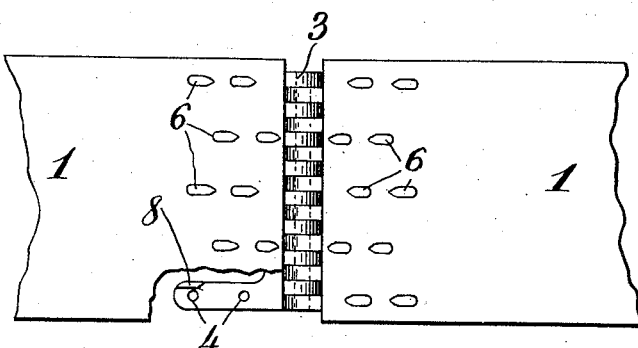
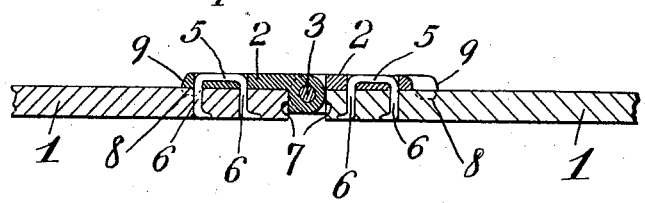
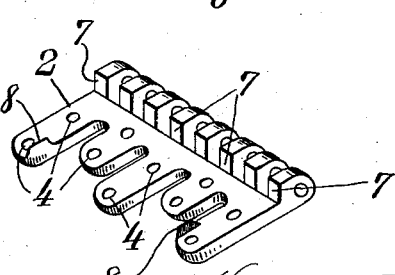
Witnesses:
William F. Marresford, Inventor
By his Attorneys
Edwards, Sager & Wooster

UNITED STATES PATENT OFFICE.

WILLIAM F. MARRESFORD, OF BROOKLYN, NEW YORK.

BELT-FASTENER.

1,078,053.

Specification of Letters Patent.

Patented Nov. 11, 1913.

Application filed December 13, 1912. Serial No. 736,483.

*To all whom it may concern:*

Be it known that I, WILLIAM F. MARRESFORD, a citizen of the United States, residing at Brooklyn, in the county of Kings and State of New York, have invented certain new and useful Improvements in Belt-Fasteners, of which the following is a full, clear, and exact specification.

This invention relates to belt fasteners, and has particular reference to belt fasteners of the rigid and hinged types, wherein provision is made for a bending motion between the two ends of the belt, the fastener itself being so constructed as to permit this motion to take place at maximum efficiency, with the least wear and tear of the belt, and with substantially no interference with the full contact of the belt with the pulley.

An object of the invention is to provide an improved belt fastener comprising one or more joining members combined with fastening means so constructed that the strain of the belt will be equally distributed to a plurality of integrally joined fastenings which pass through the joining member or members of the fastener itself, without weakening the belt by the fasteners. The joining member of the fastener is provided with a plurality of sets of holes of predetermined spacing, the sets of holes being disposed preferably longitudinally of the belt and the spacing of the sets being of equal distance.

Another object of my invention is the provision of locating or gaging means for preserving the position of the joining member while the securing means is being applied.

Other objects and features of my invention will be more fully understood from the following description, and from the accompanying drawings, in which—

Figure 1 is a top plan view showing one form of my invention; Fig. 2 is a bottom plan view thereof; Fig. 3 is a sectional view along the line 3—3; and Fig. 4 is an isometric view of a joining member, with its bottom face turned upward.

1, 1 represent the ends of the belt to be joined by the fastener, preferably consisting of two joining members 2, 2 hinged or otherwise flexibly connected together as by a pintle 3, which pintle can be made removable if desired to enable the belt to be easily manipulated. Each of the joining members 2 is provided with a plurality of sets of holes 4, arranged substantially parallel to one another and longitudinally of the belt, the sets of holes being disposed preferably in staggered relation across the belt. The fasteners 5, shown as U-shaped staples and of equal dimension between the shanks 6 are separate from the joining member 2, the shanks 6 being of sufficient thinness so as not to materially cut the fiber of the belt. The ends of the shanks 6 are clenched on the bottom side of the belt, preferably in the direction toward the end of the belt, as indicated in Fig. 3.

When it is desired to apply my fastener to a belt, each joining member 2 is separately applied to an end of the belt. In order to insure the proper locating or gaging of the joining member 2, I square the inner faces 7 of the hinge portions (see Figs. 3 and 4), and also provide the joining member with a plurality of locating points 8. Thus, after the end of the belt has been cut square with the length thereof, the abutments 7 are brought flush with the end of the belt, and the joining member 2 may then be located by tapping the positioning points 8 into the belt, whereupon on the staples 5 are inserted in position, and the ends of the shanks 6 clenched as above described.

One advantage of my structure comprising a joining member and fastening means separable therefrom, is that when the strain comes on the belt the several shanks of each staple are supported by the bridge portion thereof, acting in conjunction with the spaced holes 4 in the members 2, so that a more rigid, non-stretching and non-slipping joint is secured than is possible with clenching devices integral with the plate, as heretofore. Also, the shanks of the staples do not cut the belt, but nevertheless are of sufficient width and thickness by virtue of the coöperative action of the bridge portion with the joining member, whereby to firmly hold the ends of the belt together when placed in operative position. Furthermore, this belt fastener can be used repeatedly, it being simply necessary to withdraw the staples and use new ones for fastening the joining member in its new position.

It will be noted that my invention secures a maximum reinforcing effect between the joining member and the separable fastenings, notwithstanding that the fastenings are separate from the joining plate member. Moreover, the nature of the securing means is such that the clenched ends sink into the fibers of the belt, and present substantially no interference with the full contact of the belt with the pulley, such full contact of the belt with the pulley being enhanced by using the hinged or flexible form of my fastener. It will also be seen that the construction of my belt fastener insures the proper positioning of the fastener with maximum efficiency, even though the fastener be applied by an unskilled mechanic.

It is desirable to bevel the sides of the fingers of the joining member, as indicated at 9, and to countersink the holes 4 in the joining member, and thereby avoid obstructing parts; this is advantageous for belts which are shifted by hand from one step to another on cone pulleys, or the like.

Whereas, I have illustrated my invention by one specific form thereof, it will be understood that many changes and modifications may be made without departing from my invention.

Having thus described my invention, I declare that what I claim as new and desire to secure by Letters Patent, is:—

1. A belt fastener comprising a flat plate serving as a joining member and having a plurality of sets of holes of predetermined spacing, the respective holes of each set lying longitudinally of the belt, and U-shaped staples passing through said sets of holes of said plate and piercing the belt at longitudinally separated points.

2. A belt fastener comprising two hinged flat plates serving as joining members, each plate being provided with a plurality of sets of holes of predetermined spacing, the respective holes of each set lying longitudinally of the belt, and staples having a plurality of prongs connected by an integral bridge of a length equal to the spacing between the extreme holes of each set, said staples passing through the holes of said plate and piercing the belt at longitudinally separated points, the ends of the prongs being adapted to be clenched on the under side of said belt into the fiber in a direction longitudinally of the belt and toward the adjacent ends of the belt.

3. A belt fastener comprising a flat plate having a plurality of sets of holes of predetermined spacing, each set of holes being disposed longitudinally of the belt, the portions of the plate lying in a line between the holes of each set being sunk below the face of the plate, and staples passing through said sets of holes and piercing the belt at longitudinally separated points, the bridge portions of said staples being disposed in said sunk portions of the plate.

4. A belt fastener comprising a plate having a plurality of series of longitudinally arranged apertures adapted for the insertion of longitudinally arranged staples and a plurality of knuckles at one end of said plate, said knuckles having alined apertures adapted to receive a pintle, certain of said knuckles having alining flat faces adapted to engage the end of the belt and thereby gage the positioning of the fastener plate on the belt.

5. A joining member of a belt fastener comprising a plate having a plurality of series of longitudinally arranged apertures adapted for the insertion of longitudinally arranged staples, a plurality of knuckles having alined apertures adapted to receive a pintle, certain of said knuckles having alining faces to engage the end of the belt, and a projection adapted to be forced into the belt for maintaining the alinement of the plate.

In testimony whereof I affix my signature, in presence of two witnesses.

WILLIAM F. MARRESFORD.

Witnesses:
HENRY J. LUCKE,
JOSEPH D. CONNOLLY.

Copies of this patent may be obtained for five cents each, by addressing the "Commissioner of Patents, Washington, D. C."